(12) United States Patent
Goldberg et al.

(10) Patent No.: US 6,735,332 B1
(45) Date of Patent: May 11, 2004

(54) SYSTEM FOR DETERMINING THE POSITION OF AN OBJECT ON A TRANSPORT ASSEMBLY FROM ITS BOUNDARY POINTS

(75) Inventors: David Goldberg, Palo Alto, CA (US); Marshall W. Bern, San Carlos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/539,736

(22) Filed: Mar. 30, 2000

(51) Int. Cl.$^7$ .............................. G06K 9/46; G06T 7/60
(52) U.S. Cl. ..................... 382/141; 382/199; 382/203; 382/291
(58) Field of Search ................. 382/203, 141, 382/151, 153, 101, 291, 241, 199; 271/4.03, 3.13, 10.03, 111, 259, 265.02, 265.03

(56) References Cited

U.S. PATENT DOCUMENTS

| | | | |
|---|---|---|---|
| 5,353,358 A | * 10/1994 | Baird et al. | 382/141 |
| 5,634,636 A | 6/1997 | Jackson et al. | 271/225 |
| 5,839,722 A | * 11/1998 | Berlin et al. | 269/57 |
| 5,933,523 A | * 8/1999 | Drisko et al. | 382/151 |

FOREIGN PATENT DOCUMENTS

JP  09305700 A  * 11/1997  ............ G06K/9/20

OTHER PUBLICATIONS

Halverson. "Calculating the Orientation of Rectangular Target in SAR Imagery." Proc. of the IEEE 1992 Aerospace and Electronics Conference, vol. 1, May 18, 1992, pp. 260–264.*

Gaston, Peter C. et al. "Tactile Recognition and Localization Using Object Models: The Case of Polyhedra on a Plane," Transactions on Pattern Analysis and Machine Intelligence, vol. PAMI–6, No. 3, May 1984, pp. 257–266.

* cited by examiner

Primary Examiner—Jon Chang

(57) ABSTRACT

A system determines the position of an object located on a transport assembly. Sensor arrays are embedded in the transport assembly for identifying boundary locations of the object. The sensor arrays are spaced apart in an arrangement for detecting the locations at which the object crosses the sensor arrays. These locations provide a set of boundary points. The system computes the equation of a rectangle that identifies the location of the object on the transport assembly by minimizing the deviation of the set of boundary points from the boundary of the equation of the rectangle.

28 Claims, 12 Drawing Sheets

FIG. 15
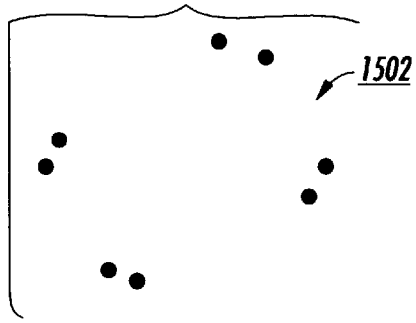
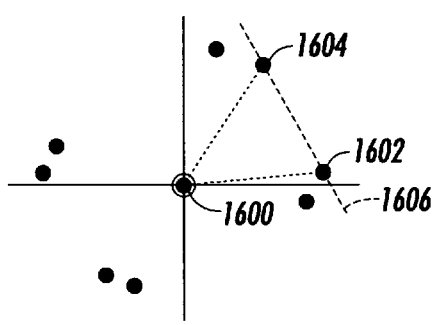
FIG. 16
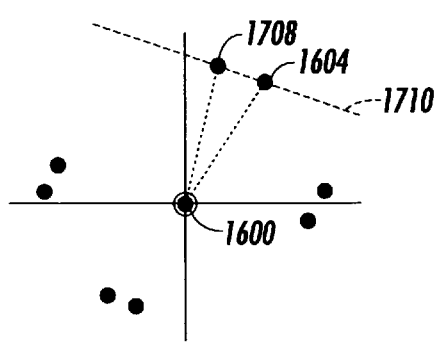
FIG. 17

FIG. 18
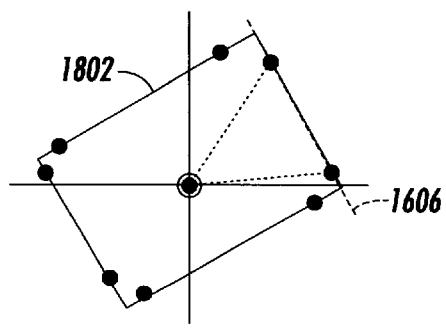
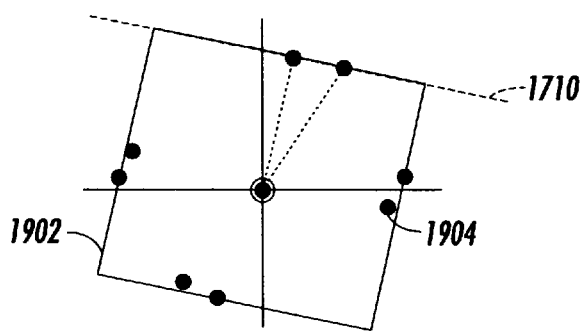
FIG. 19
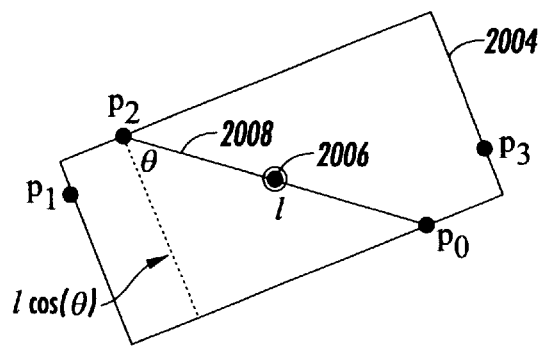
FIG. 20

SYSTEM FOR DETERMINING THE POSITION OF AN OBJECT ON A TRANSPORT ASSEMBLY FROM ITS BOUNDARY POINTS

BACKGROUND OF THE INVENTION

1. Field of the Invention

The present invention relates generally to a transport assembly or conveyor, and more particularly, to a method for identifying the position and size of an object on the transport assembly.

2. Description of Related Art

In order for a controller of a transport assembly to compute the position of objects positioned thereon, the controller continuously receives sensory information that identifies the presence or absence of an object on sensors embedded in the transport assembly. After receiving the sensory information and computing a position of the object on the transport assembly, the controller corrects discrepancies in the desired position, orientation, and speed of the object by outputting commands to actuators in the transport assembly.

To reduce fabrication costs and insure scalability of the transport assembly, the number of sensors and the amount of information provided by the sensors needs to be minimized. Accordingly, it is desirable to minimize the amount of sensory information necessary to precisely and rapidly control in realtime the position and velocity of an object moving on the transport assembly. In addition, it would be advantageous if the controller were sufficiently robust to accurately determine the position of the object on the transport assembly in the presence of noisy sensory information.

SUMMARY OF THE INVENTION

In accordance with the invention, there is provided a transport assembly for moving objects thereon. The transport assembly includes a transport controller that computes a position of an object on the transport assembly from sensor output. In accordance with one aspect of the invention, the sensors are arranged on the transport assembly in a pattern that is adapted to produce boundary information of objects positioned thereon. In one embodiment, the sensors are arrays of point sensors that are arranged perpendicular to each other. In operation, each sensor array outputs one or more boundary points when an object covers only part of the sensor array.

In accordance with another aspect of the invention, the transport controller computes an equation of a rectangle that minimizes the deviation of boundary points, output from the sensor arrays, from the boundary of the computed equation of the rectangle. From the computed equation of the rectangle, the position of the object on the transport assembly is determined. Advantageously, the transport controller computes the equation of the rectangle even though boundary points are received from the transport assembly in the presence of noise (i.e., the points do not lie precisely on the boundary of the object on the transport assembly). After determining the position of the object on the transport assembly, the transport controller adjusts the actuators to direct the object to its desired position.

BRIEF DESCRIPTION OF THE DRAWINGS

These and other aspects of the invention will become apparent from the following description read in conjunction with the accompanying drawings wherein the same reference numerals have been applied to like parts and in which:

FIG. 15 illustrates an example set of eight boundary points;

FIG. 16 illustrates a first pair of adjacent points of the set of points shown in FIG. 15 with a line extending therethrough;

FIG. 17 illustrates a second pair of adjacent points of the set of points shown in FIG. 15 with a line extending therethrough;

FIG. 18 illustrates a bounding rectangle defined by the line shown in FIG. 16;

FIG. 19 illustrates a bounding rectangle defined by the line shown in FIG. 17;

FIG. 20 illustrates an example of four boundary points with at least one boundary point per side;

DETAILED DESCRIPTION

A. Operating Environment

Figure 1:
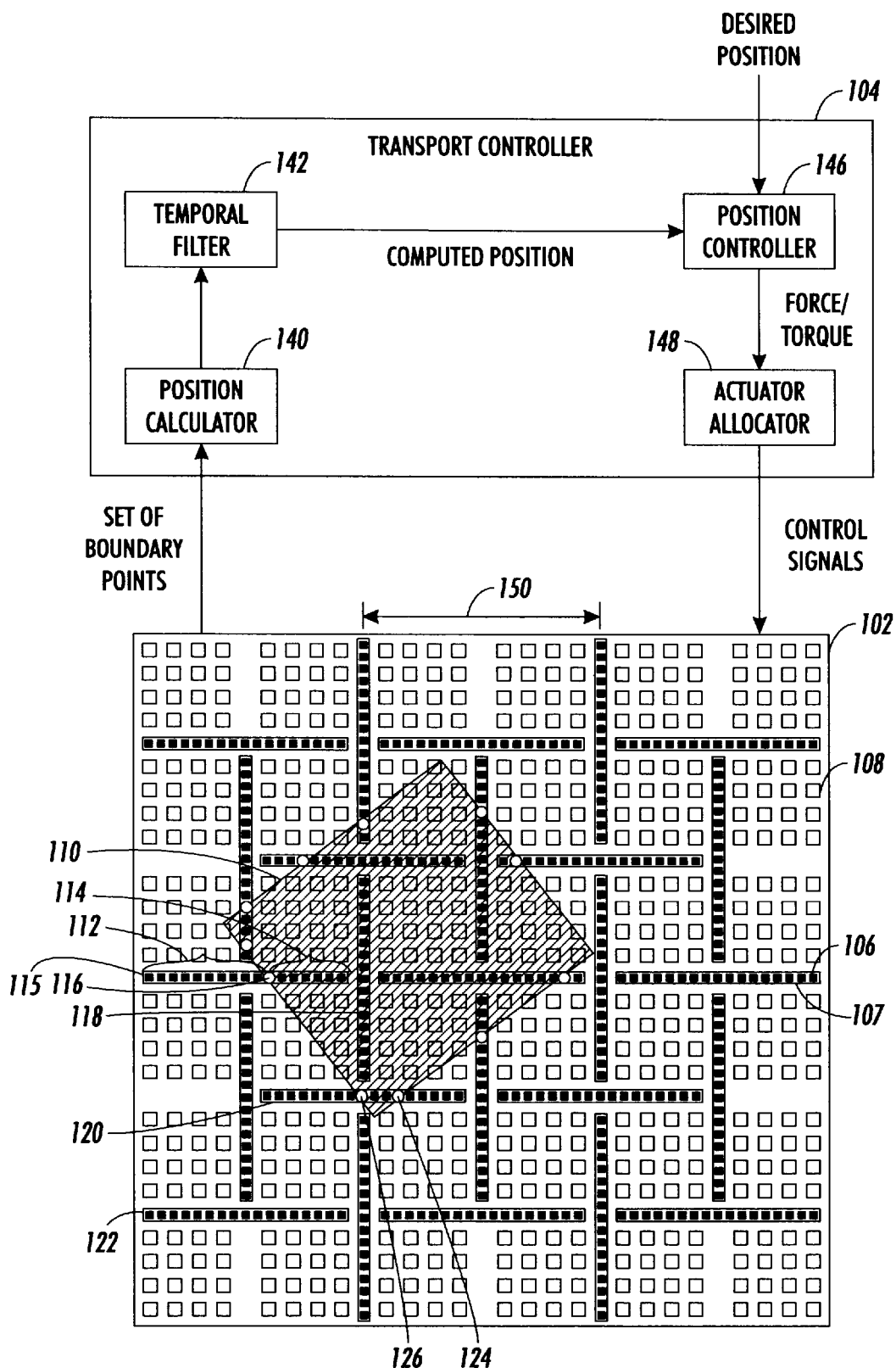
FIG. 1 illustrates the operating environment for carrying out the present invention.

FIG. 1 illustrates an operating environment for carrying out the present invention. The operating environment includes a transport controller 104 and a transport assembly 102 with embedded sensors 106 and actuators 108. The sensors 106 feed sensory information into the controller 104, which then directs actuators 108 to make small adjustments in the movement of an object 110 on the transport assembly 102. More specifically, the controller 104 uses the sensory information to determine and output settings that turn individual actuators 108 on and off to support and/or propel an object 110 to a desired position on the transport assembly 102. In one embodiment, the actuators 108 are air jet actuators as described in U.S. Pat. No. 5,634,636, which is incorporated herein by reference. In an alternate embodiment, the actuators 108 are rollers that are engaged by a mechanical drive.

It will be appreciated by those skilled in the art that depending on the size, weight and flexibility of the object 110 and the speed and accuracy in which the object 110 is required to be transported, the transport assembly 102 illustrated in FIG. 1 may consist of an upper section and a lower section as disclosed in U.S. Pat. No. 5,634,636 for transporting the object 110 therebetween. In one embodiment, the transport assembly 102 is adapted to transport paper in for example a reprographics machine. It will also be appreciated by those skilled in the art that the actuators and sensors in the transport assembly can be fabricated separate from or integral with the controller 104.

It will be further appreciated by those skilled in the art that the actuators 108 may be positioned in the transport assembly 102 to impart forces in multiple directions (i.e., longitudinal, vertical and/or lateral) that vary in strength depending on the type of material and size of the object 110. For example, the object 110 may be rotated by having a first set of actuators, located on one side of the object, push in a process direction, while having a second set of air jet actuators, located on the other side of the object, push in a direction opposite to the process direction so that the combined effect of the two sets of air jet actuators is to apply a torque to the object.

Figure 2:
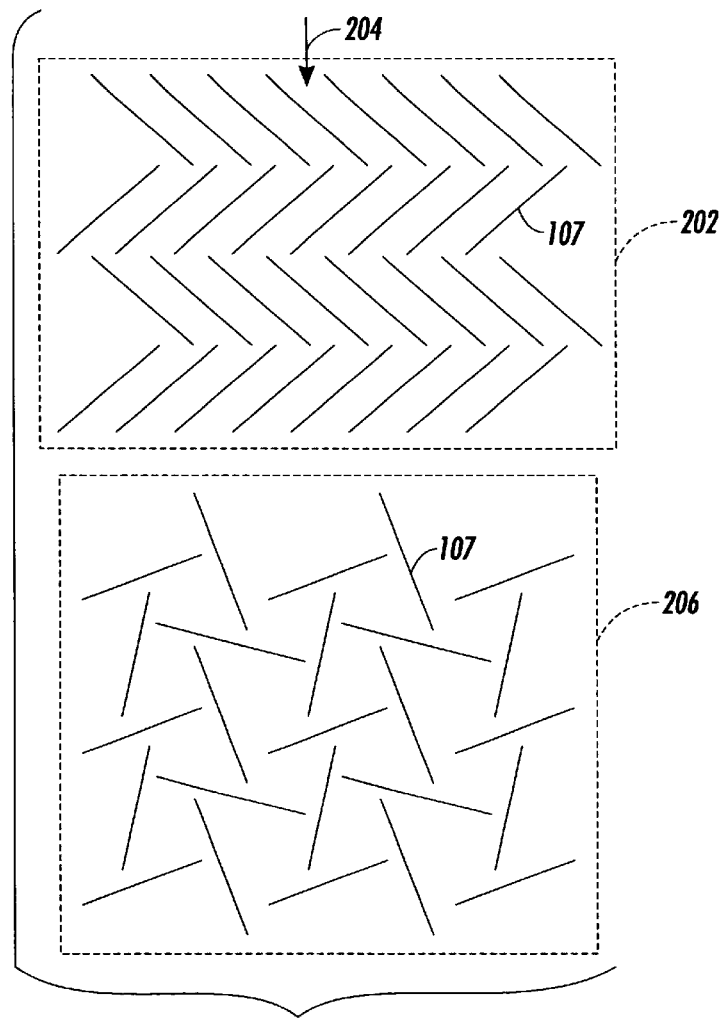
FIG. 2 illustrates two alternate arrangements of the sensor arrays shown in FIG. 1.

In accordance with the invention, the sensors 106 are arranged in a pattern of arrays of closely spaced point sensors (i.e., sensor array 107). FIGS. 1 and 2 illustrate different arrangements of sensor arrays that produce boundary points for the position calculator 140. These different arrangements are not intended to define a comprehensive set of possible arrangements. Instead, the arrangements shown in FIGS. 1 and 2 are intended to illustrate some of the many different possible arrangements of sensor arrays that can be used to insure that a certain number of boundary points will be produced no matter the position or orientation of an object on the transport assembly. In a preferred embodiment, the sensor arrays are organized in an arrangement that produces at least one boundary point on every side and at least two boundary points on at least two sides of the object no matter what the orientation or position is of the smallest object that is intended to be transported on the transport assembly.

In FIG. 1, the sensor arrays 107 are arranged perpendicular to each other in a grid-like pattern. In order to define at least two boundary points per side in the arrangement shown in FIG. 1, the object 110 would have no side that is less than the distance identified by reference number 150. FIG. 2 illustrates two alternate arrangements of the sensor arrays 107 shown in FIG. 1. The sensor arrays in the arrangement 202 are positioned in a herringbone pattern. The herringbone pattern provides a greater number of boundary points when an object is traveling in a direction that is either parallel to or perpendicular to the process direction 204. In contrast the sensor arrays in the arrangement 206 are positioned so that each sensor array is rotated by a predefined angle from the positions of the sensor arrays shown in FIG. 1. More generally, the sensor arrays illustrated in the arrangement 206 are rotated relative to adjacent arrays of point sensors by a predefined angle. The advantage of the angular rotation between adjacent sensor arrays is that it minimizes the distance 150 (shown in FIG. 1) between sensor arrays with only one crossing in any one direction.

Referring again to FIG. 1, each point sensor forming a sensor array produces output that reports whether the point on the transport assembly is covered or uncovered by the object 110. For example, the sensors 112 along the sensor array 115 report being uncovered while the sensors 114 along the sensor array 115 report being covered. Depending on the position of the object 110, each array of point sensors is in one of three states (assuming the object is convex): a) the object completely covers the sensor array (e.g., sensor array 118); b) the sensor array is not covered at all by the object (e.g., sensor array 122); and c) the object intersects the sensor array at either one or two points boundary points (e.g., sensor arrays 115 and 120, respectively).

Data output from the sensors 106 by the transport assembly to the transport controller 104 is limited to boundary point crossings on the sensor arrays. Advantageously, limiting transport assembly output to boundary point crossings minimizes the data output to the transport controller, thereby allowing the transport assembly to be readily scalable and computationally efficient. More specifically, electronics in the transport assembly filters the data output by each point sensor in each sensor array to include only those points that define boundaries of the object on the transport assembly. In the example illustrated in FIG. 1, the transport assembly 102 produces eleven boundary points for the object 110. Each boundary point is identified on the sensor arrays by circles. For example, the sensor array 115 produces the boundary point 116 and the sensor array 120 produces the boundary points 124 and 126, while the sensor array 118 produces no boundary points.

Upon receipt of a set of boundary points from the transport assembly 102, a position calculator 140 determines the position of the object on the transport assembly from the set of boundary points. More specifically, the set of boundary points received by the position calculator 140 is a list of (x,y) coordinates of points on the boundary of the object 110. The position calculator 140 does not receive any negative information about which sensor arrays are not crossed by the object or any information about which of the sensor arrays are completely crossed. Because only (x,y) coordinates are provided, the position calculator 140 does not know the side of a sensor crossing on which the object lies, nor does it know the location of the sensor arrays on the transport assembly.

There exists a number of advantages for ignoring negative information. First, scalability of the transport assembly is improved because hardware can be simplified. Second, if there is a question of whether a boundary point crossing has been correctly identified by a sensor array, the sensor array can safely report nothing. That is, because the position calculator ignores negative information, there is no apparent loss of information.

The position calculator 140, which assumes that the object traveling on the transport assembly is rectangular in shape, outputs the position of a rectangle, or in some cases, a list of the positions of rectangles that best fit the set of boundary points to a temporal filter 142. The temporal filter 142 tracks positional information of the object's movements on the transport assembly over time. For example, when the position calculator returns the angle of the object to the temporal filter, the position calculator's only meaningful answer is a modulo of 180 degrees. However, if other parts of the transport controller require that the angle be a continuous function of time, the temporal filter 142 computes a "total" angle. The total angle is continuous and encodes a total amount of spin. That is, the number of revolutions the paper has spun is the "total" angle divided by 360 degrees.

In addition, the temporal filter 142 identifies large deviations (or jumps) between successive positions received from calculator 140. For example, if the object passes over a malfunctioning sensor array, or if the object's edge is nearly parallel to a sensor array, the position calculator may receive an insufficient number of points to accurately compute the position of the object on the transport assembly. However, because the temporal filter 142 tracks previous positions and velocities of the object, the temporal filter 142 can estimate where the next position of the object should be and detect when the output of the position calculator 140 is unreasonable. In the event an unreasonable position is identified, the temporal filter can choose to either replace it with its own estimate or the previous known position of the object. Advantageously, the temporal filter permits the position calculator to have less than 100% accuracy without adversely affecting the performance of the transport assembly.

Using the position of the object on the transport assembly computed by the calculator 140 and verified by filter 142, a position controller 146 computes the force and torque necessary to move the object from its computed position to its desired position without making the transport assembly unstable. The computed force and torque output from the position controller 146 is then converted by an actuator allocator 148 into commands for turning on selected actuators 108 to direct the object to the desired location. Once the actuators 108 receive commands from the actuator allocator 148 to apply directional forces in the form of for example air to the object 110, the sensors 106 transmit a new set of boundary points to position calculator 140. This process repeats in a closed loop fashion until the desired position is achieved.

B. Determining Position From Boundary Points

One aspect of the present invention involves the detection of the position of an object on the transport assembly that is assumed to be rectangular in shape (e.g., a sheet of paper). Detection of the position of the object involves first the identification of a set of "n" boundary points, which can vary from one cycle to the next. A cycle is defined herein as one occurrence of computing a position of the object on the transport assembly after detecting a set of boundary points, and outputting control commands to the actuators to direct the object from the computed position to its desired position. Advantageously, the computed position, which is computed each cycle by the position calculator 140, is robust against noise caused by inaccurately detected boundary positions. In addition, the position calculator 140 is adapted to robustly determine the position of the object on the transport assembly when the number of boundary points detected between cycles varies.

Figure 3:
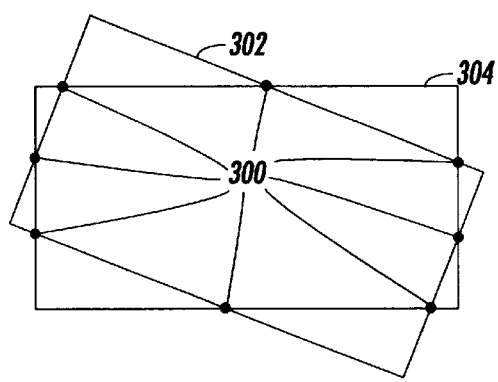
FIG. 3 illustrates that certain configurations of points may define more than one rectangle.

In accordance with the invention, the position calculator 140 computes a position for a rectangle or a set of positions for a set of rectangles that best fit the set of n boundary points $(x_i, y_i)$ received from the transport assembly 102 (where $1 \leq i \leq n$). As the number of boundary points in the set of boundary points increases, the number of distinct rectangles passing through the points $(x_i, y_i)$ in the set of boundary points decreases. FIG. 3 illustrates that even without error certain configurations of points may define more than one rectangle. More specifically, FIG. 3 illustrates that the maximum number of rectangles that can be defined with eight points, identified by the reference number 300, is two (i.e., rectangles 302 and 304). It will be appreciated, however, by those skilled in the art that when there is at least one point per side and a total of at least nine points, then there exists only a single rectangle that will satisfy that configuration of points.

B.1 Position Calculations in a System With Noise

In a transport assembly in which noise exists, the boundary points $(x_i, y_i)$ received from the transport assembly 102 are unlikely to lie exactly on the boundary of the rectangle defining the object. To account for noise, the method for determining the location of the object on the transport assembly with boundary points must be sufficiently robust to account for boundary points that do not actually lie on the boundary of the object. In the following sections a "Least Squares Method" and a "Pair Method" are disclosed for determining the location of an object given a set of boundary points. Both methods minimize deviation from the boundary points of the object. The Least Squares Method minimizes deviation by minimizing the sum of the squares of the deviations of a computed rectangle (i.e., how much the boundary points deviate from the computed boundary). In contrast, the Pair Method minimizes deviation by identifying a bounding rectangle of the boundary points that minimizes in one instance the furthest distance of any point inside the computed bounding box (i.e., how far the boundary points are from the boundary). It will be appreciated by those skilled in the art that while both methods may compute the position of a rectangle with a minimum deviation, they are not guaranteed to do so. As is discussed in more detail below, the Least Square Method, which has a linear running time, performs better for a larger number of boundary points, while the Pair Method, which has a quadratic running time, performs better for a smaller number of boundary points.

B.1.1 The Least Squares Method

The Least Square Method, which is discussed in detail in this section, determines the location of an object (i.e., a computed rectangle) given a set of boundary points by minimizing the sum of the squares of the deviations of the set of boundary points from the boundary of the computed rectangle. It is known to use a least squares computation to find a line that best fits a set of points, where a "best fit" is the fit that minimizes the sum of the squares of the deviations from a line. However, it will be appreciated by those skilled in the art that using a least squares computation of a line to find each side of a rectangle does not accurately identify a rectangle that best fits the set of boundary points. This solution cannot be implemented because it is unknown which points lie on which sides of a rectangle. That is, this solution cannot be implemented without additional steps because it is unknown for a given set of points, which subset of points should best identify a line. Furthermore, even if it were known which side to assign each point in the set of boundary points, the four lines computed with ordinary least squares would not necessarily form right angles.

Figure 4:
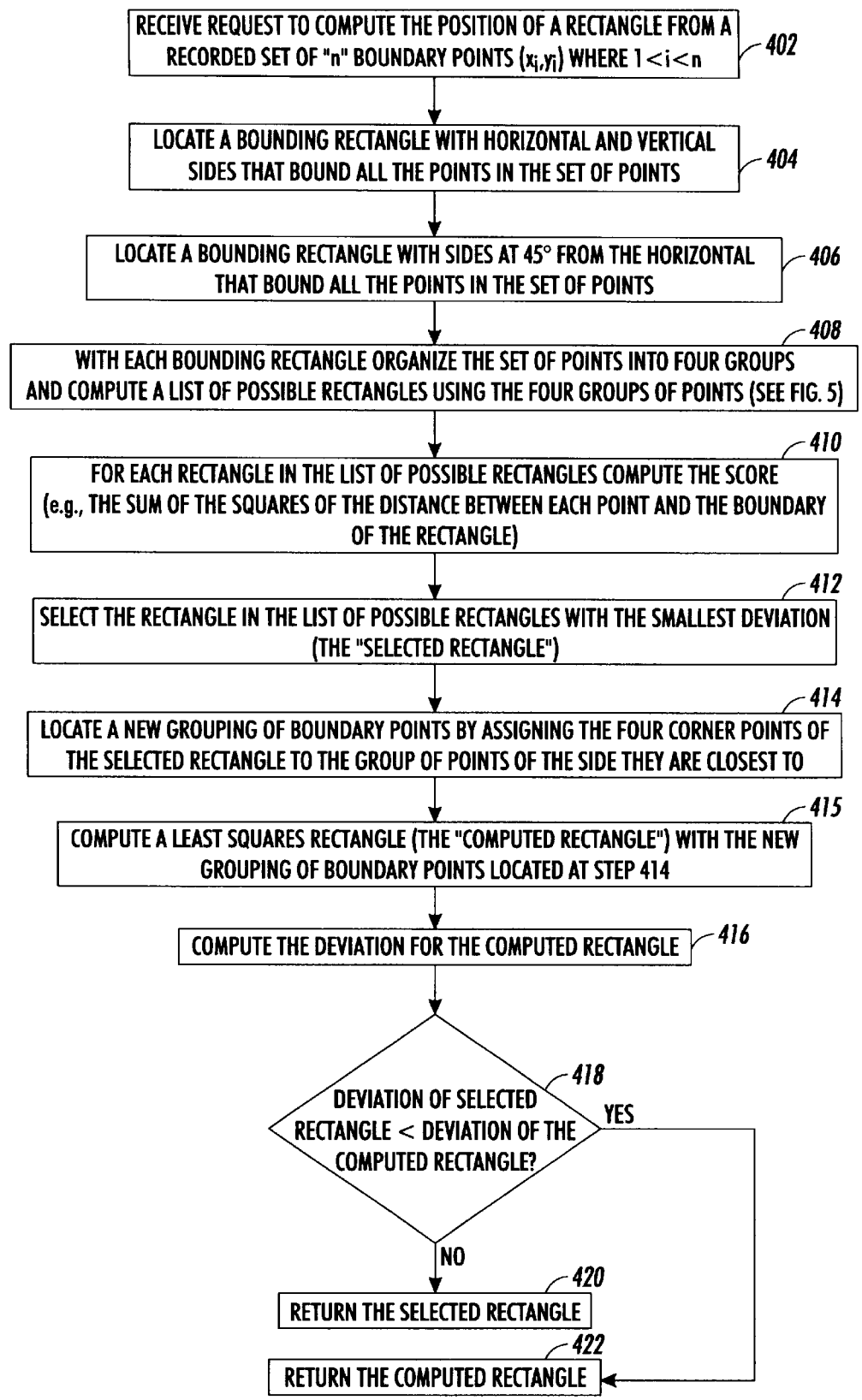
FIG. 4 is a flow diagram for carrying out the Least Squares Method of the invention.
Figure 5:
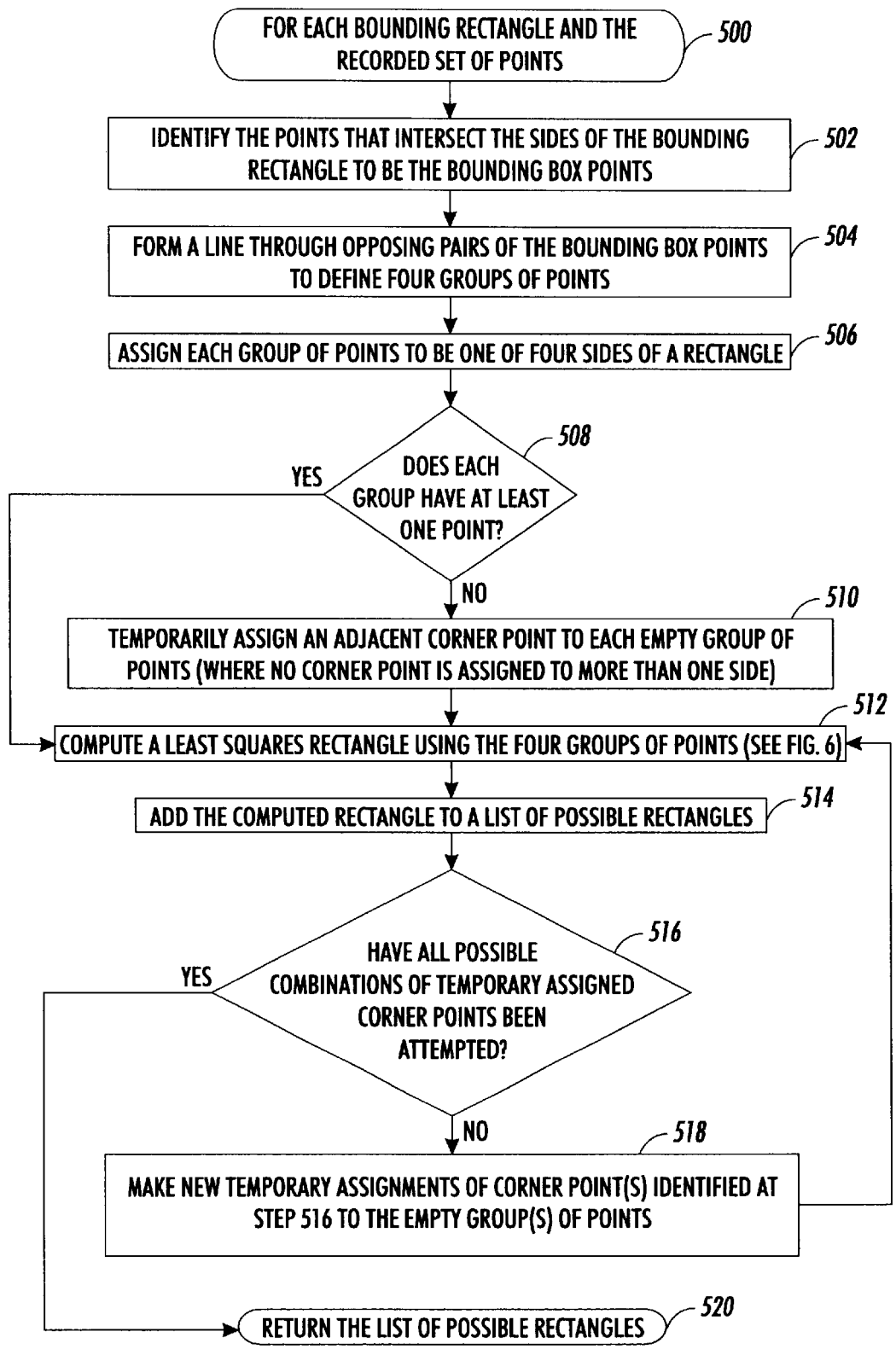
FIG. 5 is a flow diagram that sets forth step 408 shown in FIG. 4 in greater detail.
Figure 6:
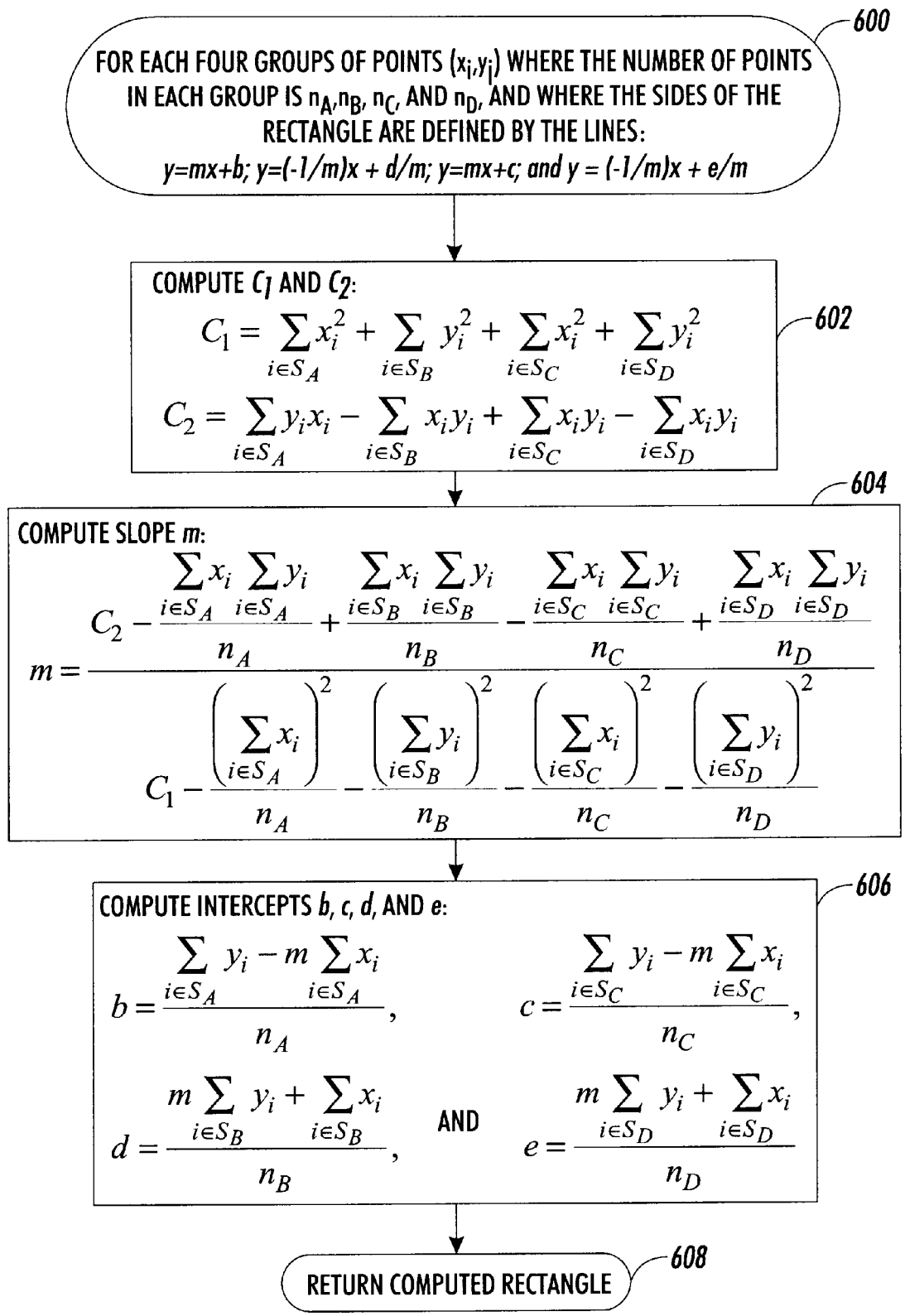
FIG. 6 is a flow diagram that sets forth step 512 shown in FIG. 5 in greater detail.
Figure 7:
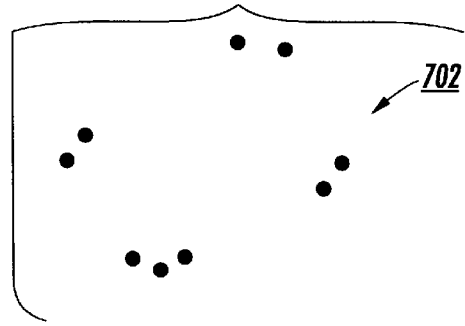
FIG. 7 illustrates an example set of nine boundary points.

In accordance with the invention, a least squares method is provided for identifying a best fitting rectangle for a given set of points. By way of overview, FIG. 4 is a flow diagram for carrying out the Least Squares Method in accordance with the present invention. FIG. 5 is a flow diagram that sets forth step 408 shown in FIG. 4 in greater detail. FIG. 6 is a flow diagram that sets forth step 512 shown in FIG. 5 in greater detail. Initially at step 402 in FIG. 4, a request is received to compute the position of a rectangle from a recorded set of n boundary points $(x_i, y_i)$ (where $1 \leq i \leq n$) output from the transport assembly 102. For example, FIG. 7 illustrates a set of nine boundary points, which are identified by reference number 702, that are received at step 402.

Figure 8:
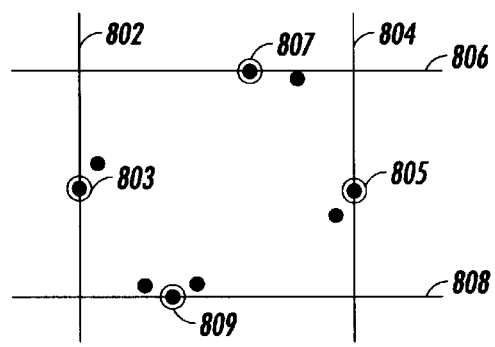
FIG. 8 illustrates a first bounding rectangle identified from the set of nine boundary points illustrated in FIG. 7.
Figure 9:
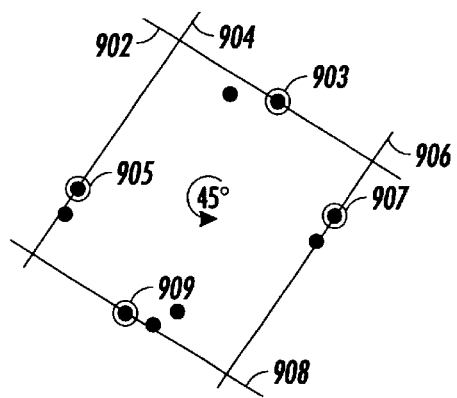
FIG. 9 illustrates a second bounding rectangle identified from the set of nine boundary points illustrated in FIG. 7.

At step 404, a bounding rectangle is located with horizontal and vertical sides that bound all the points in the set of n boundary points received at step 402. The points in the set of n boundary points that intersect the sides of the bounding rectangle are defined herein as the "bounding box points." FIG. 8 illustrates a bounding rectangle with sides 802, 804, 806, 808, located at the step 404 from the bounding box points 803, 805, 807, and 809, respectively, in the set of boundary points illustrated in FIG. 7. At step 406, another boundary rectangle is located with sides at forty-five degrees from the horizontal that bound all points in the set of n boundary points received at step 402. FIG. 9 illustrates a bounding rectangle with sides 902, 904, 906, and 908 located at step 406 from the bounding box points 903, 905, 907, and 909, respectively, in the set of boundary points illustrated in FIG. 7.

In another embodiment of the present invention, the bounding rectangles are located with sides at zero, thirty, and sixty degrees from the horizontal that bound all points in the set of n boundary points. It will be appreciated by those skilled in the art that the number of bounding rectangles located will depend on a number of factors which include but are not limited to the accuracy and number of boundary points identified by the transport assembly.

At step 408, the set of points in each of the bounding rectangles computed at steps 404 and 406 are organized into four groups from which a list of possible rectangles is computed. Referring now to FIG. 5 which sets forth step 408 in detail, initially at step 502 the points that intersect the sides of the bounding rectangle are identified as the bounding box points for each bounding rectangle and corresponding set of recorded boundary points received at step 500. It will be appreciated by those skilled in the art that the identified bounding box points define the approximate location of the corners of a possible rectangle that fit the set of recorded boundary points. At step 504, a line is formed through opposing pairs of the bounding box points identified at step 502 to define four groups of points, which are assigned at step 506 to be one of four sides of the possible rectangle.

Figure 10:
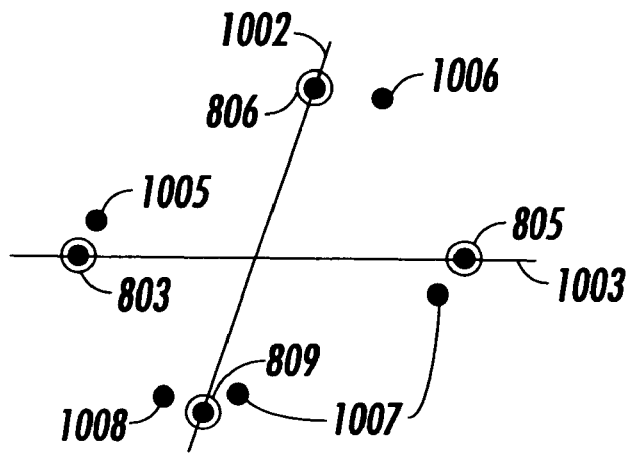
FIG. 10 illustrates a first grouping of points that are segmented from lines defined by opposing bounding box points identified in FIG. 8.
Figure 11:
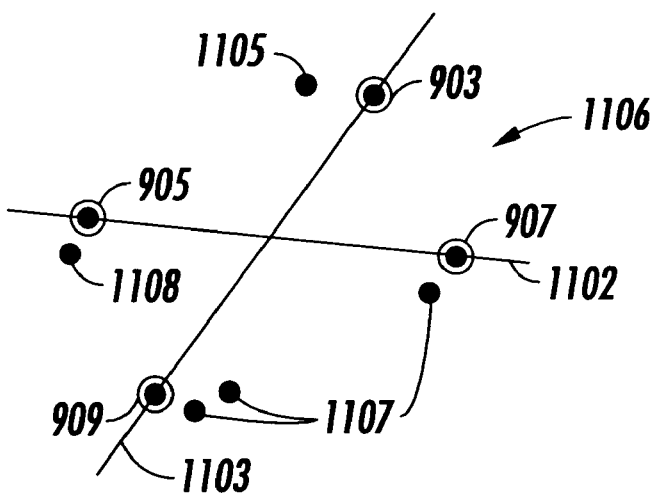
FIG. 11 illustrates a second grouping of points that are segmented from lines defined by opposing bounding box points identified in FIG. 9.

For example, FIG. 10 illustrates four groups of points 1005–1008 that are segmented by the lines 1002 and 1003 defined by opposing bounding box points 806 and 809, and opposing bounding box points 803 and 805, respectively, which are identified in FIG. 8. In contrast, FIG. 11 illustrates four groups of points 1105–1108 (with one group 1106 having no points) that are segmented by lines 1102 and 1103 defined by opposing bounding box points 905 and 907 and opposing bounding box points 903 and 909, respectively, which are identified in FIG. 9.

At step 508, if each group of points identified at step 504 does not have at least one point, then step 510 is performed; otherwise, step 512 is performed. At step 510, when one or more groups of points identified at step 504 is empty. (i.e., includes no points), then a corner point adjacent to an empty group of points is temporarily defined to be a point in that group of points. Note, however, that no corner point may be assigned to more than one side at a time. Step 510 is repeated for each possible assignment of empty groups of points and sides. For example, the empty group of points 1106 in FIG. 11 is defined in one instance using the box corner point 903 and in another instance using the box corner point 907. Note that if there are two empty groups of points then the number of different assignments may be greater than two.

At step 512, a least squares rectangle is computed using the four groups of points identified at steps 506. If more than one set of four groups of points is identified at step 510 then step 512 is repeated for each occurrence. The steps for computing a least squares rectangle without using dimensions of the rectangular object is set forth in FIG. 6 for four groups of boundary points $(x_i, y_i)$ received at step 600. More specifically, the least squares equations set forth in steps 602, 604, and 606 of FIG. 6 are derived as follows. Assuming the equations of the four sides of the rectangle are defined using equations for a line as follows:

$$y = mx + b, \qquad [A]$$

$$y = \left(\frac{-1}{m}\right)x + \frac{d}{m}, \qquad [B]$$

$$y = mx + c, \text{ and} \qquad [C]$$

$$y = \left(\frac{-1}{m}\right)x + \frac{e}{m} \qquad [D]$$

where:

m is a slope; and b, c, d, and e are y-intercepts.

The best fitting rectangle is one that minimizes the quantity:

$$Q = \sum_{i \in S_A} (y_i - mx_i - b)^2 + \sum_{i \in S_B} (my_i + x_i - d)^2 + \sum_{i \in S_C} (y_i - mx_i - c)^2 + \sum_{i \in S_D} (my_i + x_i - e)^2,$$

where:

the variables b, c, d, e and m define the rectangle, $(x_i, y_i)$ is a boundary point of the rectangle, $S_A$, $S_B$, $S_C$, and $S_D$, are four groups of boundary points corresponding to each side of the rectangle, and $$n_A = \sum_{i \in S_A} 1, \; n_B = \sum_{i \in S_B} 1, \; n_C = \sum_{i \in S_C} 1, \text{ and } n_D = \sum_{i \in S_D} 1,$$

are the number of boundary points $(x_i, y_i)$ in each group of boundary points $S_A$, $S_B$, $S_C$, and $S_D$, of the rectangle, respectively.

The goal of this computation is to find the value of these variables that minimize "Q". Although it may be a close approximation, the sum Q is not the distance of the points to the rectangle for two reasons. First, the distance from a point $(x_i, y_i)$ to a line y=mx+b is $|y_i - mx_i - b|/(1+m^2)^{1/2}$, not $|y_i - mx_i - b|$. Second, even if the factor of $(1+m^2)^{1/2}$ was included, this factor would be used to measure the distance to a configuration of four infinite lines, not the actual rectangle.

When assigning each group of points to one of the equations of the four lines (i.e., four sides) [A], [B], [C], and [D] of a rectangle at step 506, there exists an ambiguity as to which of two groups of points are assigned a slope m and which of the other two groups of points are assigned a slope (−1/m). It is desirable that this ambiguity is reconciled by selecting the groups of points so that $|m| \leq 1$ so that the factor of $(1+m^2)^{1/2}$ is close to one. This selection is simplified because opposite groups of points must be matched with opposite sides (i.e., two opposing groups of points must be matched with lines [A] and [C], which have slope m, and the other two opposing groups of points must be matched with the lines [B] and [D], which have slope (−1/m)).

The first step in minimizing Q is to compute the partial derivatives as follows:

$$-\frac{1}{2}\frac{\partial Q}{\partial b} = \sum_{i \in S_A} (y_i - mx_i - b),$$

$$-\frac{1}{2}\frac{\partial Q}{\partial d} = \sum_{i \in S_B} (my_i + x_i - d),$$

$$-\frac{1}{2}\frac{\partial Q}{\partial c} = \sum_{i \in S_C} (y_i - mx_i - c),$$

$$-\frac{1}{2}\frac{\partial Q}{\partial e} = \sum_{i \in S_D} (my_i + x_i - e), \text{ and}$$

$$\frac{1}{2}\frac{\partial Q}{\partial m} = \sum_{i \in S_A} (y_i - mx_i - b)x_i + \sum_{i \in S_B} (my_i + x_i - d)y_i$$
$$- \sum_{i \in S_C} (y_i - mx_i - c)x_i + \sum_{i \in S_D} (my_i + x_i - e)y_i.$$

Setting these derivatives to zero and writing this as a system in the four unknowns m, b, c, and d gives:

$$\left(\sum_{i \in S_A} x_i\right) m + n_A b = \sum_{i \in S_A} y_i$$

$$\left(\sum_{i \in S_B} y_i\right) m - n_B d = \sum_{i \in S_B} x_i$$

$$\left(\sum_{i \in S_C} x_i\right) m + n_C c = \sum_{i \in S_C} y_i$$

$$\left(\sum_{i \in S_D} y_i\right) m - n_D e = -\sum_{i \in S_D} x_i$$

$$C_1 m + \left(\sum_{i \in S_A} x_i\right) b + -\left(\sum_{i \in S_B} y_i\right) d + \left(\sum_{i \in S_C} x_i\right) c - \left(\sum_{i \in S_D} y_i\right) e = C_2$$

where, $$C_1 = \sum_{i \in S_A} x_i^2 + \sum_{i \in S_B} y_i^2 + \sum_{i \in S_C} x_i^2 + \sum_{i \in S_D} y_i^2, \text{ and} \quad [1]$$

$$C_2 = \sum_{i \in S_A} y_i x_i - \sum_{i \in S_B} x_i y_i + \sum_{i \in S_C} x_i y_i - \sum_{i \in S_D} x_i y_i. \quad [2]$$

Eliminating b, c, d, and e gives the following equation for m:

$$C_1 m + \left(\sum_{i \in S_A} x_i\right) \frac{\sum_{i \in S_A} y_i - m \sum_{i \in S_A} x_i}{n_A} - \left(\sum_{i \in S_B} y_i\right) \frac{\sum_{i \in S_B} y_i m + \sum_{i \in S_B} x_i}{n_B} +$$

$$\left(\sum_{i \in S_C} x_i\right) \frac{\sum_{i \in S_C} y_i - m \sum_{i \in S_C} x_i}{n_C} - \left(\sum_{i \in S_D} y_i\right) \frac{\sum_{i \in S_D} y_i m + \sum_{i \in S_D} x_i}{n_D} = C_2$$

Or, writing m directly as:

$$m = \frac{C_2 - \frac{\sum_{i \in S_A} x_i \sum_{i \in S_A} y_i}{n_A} + \frac{\sum_{i \in S_B} x_i \sum_{i \in S_B} y_i}{n_A} -}{C_1 - \frac{\left(\sum_{i \in S_A} x_i\right)^2}{n_A} - \frac{\left(\sum_{i \in S_B} y_i\right)^2}{n_B} - \frac{\left(\sum_{i \in S_C} x_i\right)^2}{n_C} - \frac{\left(\sum_{i \in S_D} y_i\right)^2}{n_D}} \quad [3]$$

$$\frac{\sum_{i \in S_C} x_i \sum_{i \in S_C} y_i}{n_C} + \frac{\sum_{i \in S_D} x_i \sum_{i \in S_D} y_i}{n_D}$$

Then b, c, d, and e follow as:

$$b = \frac{\sum_{i \in S_A} y_i - m \sum_{i \in S_A} x_i}{n_A}, \quad [4]$$

$$c = \frac{\sum_{i \in S_C} y_i - m \sum_{i \in S_C} x_i}{n_C}, \quad [5]$$

$$d = \frac{m \sum_{i \in S_B} y_i + \sum_{i \in S_B} x_i}{n_B}, \text{ and} \quad [6]$$

$$e = \frac{m \sum_{i \in S_D} y_i + \sum_{i \in S_D} x_i}{n_D}. \quad [7]$$

Referring again to FIG. 6, for each group of boundary points $S_A$, $S_B$, $S_C$, and $S_D$, with $n_A$, $n_B$, $n_C$, and $n_D$, boundary points each, the slope and y-intercepts of the sides of the rectangle for the four equations [A], [B], [C], and [D], respectively, set forth above are computed. At step 602, values for $C_1$ and $C_2$ are computed using equations [1] and [2], respectively, defined above. Subsequently at step 604, the slope m is computed using equation [3] defined above. Finally, at step 606 the y-intercepts b, c, d, and e defined by equations [4], [5], [6], and [7], respectively, defined above are computed. At step 608, the values for m, b, c, d, and e that define the lines of a rectangle are returned at step 512 in FIG. 5.

Figure 12:
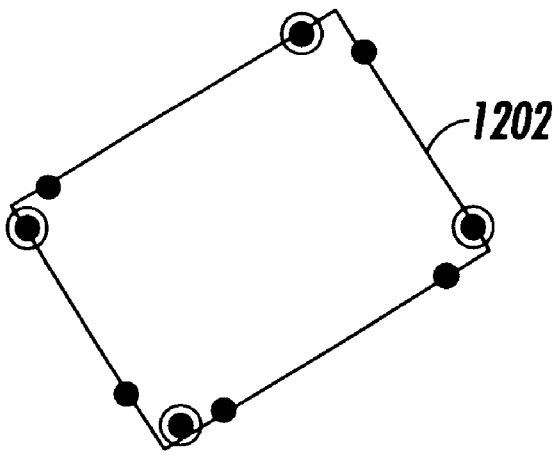
FIG. 12 illustrates one possible rectangle given the grouping of points set forth in FIG. 10.
Figure 13:
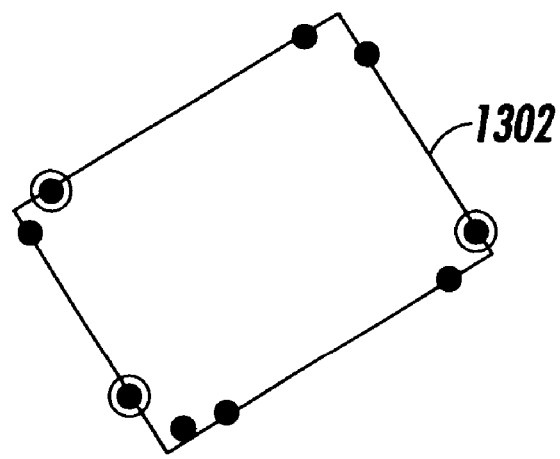
FIG. 13 illustrates one possible rectangle given the grouping of points set forth in FIG. 11.

Referring again to FIG. 5, at step 514 the rectangle computed at step 512 is added to a list of possible rectangles. If at step 516 all possible combinations of temporary points have not been attempted at either step 510 or step 518, then step 518 is performed for another possible arrangement of corner points; otherwise, the list of possible rectangles is returned at step 520 to complete step 408 in FIG. 4. For example, FIG. 12 illustrates one possible rectangle 1202 and FIG. 13 illustrates a second possible rectangle 1302 for the set of points 702 illustrated in FIG. 7, which were assigned to groups as shown in FIGS. 10 and 11, respectively. Although in this example the resulting rectangles shown in FIGS. 12 and 13 have similar positions, it will be appreciated by those skilled in the art that a different set of boundary points may yield resulting rectangles with dissimilar positions.

Referring again to FIG. 4, at step 410 a score for each computed rectangle in the list of possible rectangles from step 408 is computed. One method for computing the score of a computed rectangle is to sum the squares of the distances between each point and the boundary of the computed rectangle. At step 412, a rectangle is selected (the "selected rectangle") from the list of possible rectangles that has the smallest deviation computed at step 410. At step 414, a new grouping of boundary points is identified by assigning the four corner points of the selected rectangle to the original group of points defined by $n_A$, $n_B$, $n_C$, and $n_D$ (originally determined at step 506 in FIG. 5) to the group associated with the side each point is closest to.

At step 415, a least squares rectangle is computed (the "computed rectangle") following the steps shown in FIG. 6 for the new grouping of boundary points located at step 414. At step 416, the deviation is computed for the least squares rectangle of the bounding rectangle computed at step 415. If the deviation of the selected rectangle is less than the deviation of the computed rectangle at step 418, then the selected rectangle is returned at step 420 to the temporal filter 142 to specify the position of the object on the transport assembly; otherwise, the computed rectangle is returned at step 422 to the temporal filter 142 to specify the position of the object on the transport assembly. In a simplified embodiment of the embodiment shown in FIG. 4, steps 414, 415, 416, 418, and 422 are omitted, and the rectangle selected at step 412 is returned at step 420.

B.1.2 The Pair Method

As the number of points n in the set of boundary points output by the transport assembly becomes smaller, the Least Squares Method set forth above becomes less efficient because the number of combinations for assigning corner points to empty groups at steps 510 and 518 in FIG. 5 increases as the number of points n decreases. This section discloses another method (i.e., the "Pair Method") for determining the location of an object on the transport assembly with boundary points for a small number of points n. It will be appreciated by those skilled in the art that the Pair Method performs best when there are at least five boundary points (i.e., $n \geq 5$) and there is at least one point that lies on each edge of the object.

Figure 14:
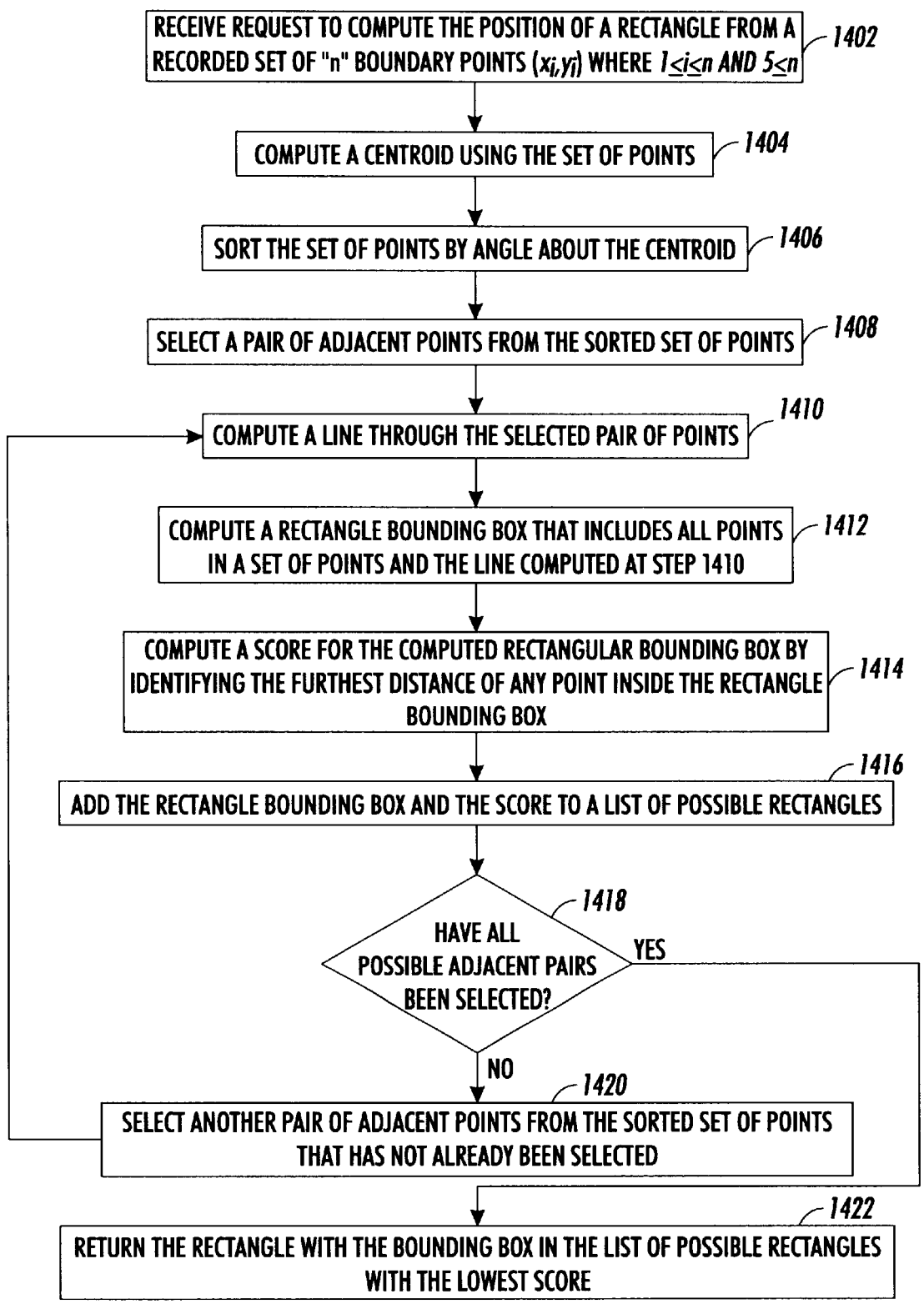
FIG. 14 sets forth the steps for carrying out the Pair Method of the invention.

FIG. 14 sets forth the steps for carrying out the Pair Method. Initially at step 1402, a set of boundary points is received by the position calculator 140 from the transport assembly 102 to calculate a position of a rectangle on the transport assembly. At step 1404, a centroid of the set of boundary points received at step 1402 is computed. Subsequently at step 1406, the boundary points in the set of boundary points received at step 1402 are sorted by an angle about the centroid computed at step 1404.

During a first iteration, a first pair of adjacent points is selected from the sorted set of points at step 1408. At step 1410, a line is computed through the pair of points selected at step 1408, during the first iteration, or at step 1420, during subsequent iterations. At step 1412, a rectangular bounding box is computed. The rectangular bounding box computed at step 1412 has two constraints. First, the rectangular bounding box must be the smallest rectangle that contains the set of boundary points received at step 1402. Second, the rectangular bounding box must have one side that is defined by the line computed at step 1410.

With the rectangular bounding box computed at step 1412, a score is computed at step 1414 by identifying the furthest distance of any point inside the computed rectangle bounding box. At step 1416, the computed rectangle bounding box and its score are added to a list of possible rectangles. If all possible adjacent pairs of points have been selected (i.e., all possible rectangular shapes been tested), then the rectangle defined by the bounding box with the lowest score in the list of possible rectangles is returned to the temporal filter 142; otherwise at step 1420, another pair of points is selected from the sorted set of points that has not already been selected and step 1410 is repeated.

By way of example, FIG. 15 illustrates a set of eight boundary points 1502 (i.e., n=8). FIG. 16 illustrates a first pair of adjacent points 1602 and 1604 of the set of points 1502 that are sorted by angle about a centroid 1600 (step 1408). In addition, FIG. 16 illustrates a computed line 1606 that extends though the adjacent pair of points 1602 and 1604 (step 1410). FIG. 17 illustrates the next pair of adjacent points 1604 and 1708 of the set of points 1502 sorted by angle about the centroid 1600 (step 1420). In addition, FIG. 17 illustrates a computed line 1710 that extends through the points 1604 and 1708 (step 1410). FIGS. 18 and 19 illustrate computed bounding rectangles 1802 and 1902 (step 1412) that are constrained by the points in the set of points 1502 and the lines 1606 and 1710 shown in FIGS. 16 and 17, respectively. Since the point 1904 is further than any other point from the boundaries of rectangles 1802 or 1902 (step 1414), the rectangle 1802 has the lowest score and would be selected over the rectangle 1902 (step 1422).

It will be appreciated, however, by those skilled in the art that different variations of the Pair Method are possible. One variation involves computing the score at step 1414 using the sum of the squares of the distances of all the points, rather than the maximum distance of one point. Another variation involves returning at step 1422 a list of rectangles that have a deviation within a predetermined threshold value instead of a single rectangle with the lowest computed score. Yet another variation involves summing the score computed at step 1414 with the deviation of the rectangle bounding box computed at step 1412 and the desired rectangle size if it is known in advance.

B.2 Combining The Least Squares Method And The Pair Method

One way to combine the Least Squares Method and the Pair Method to determine the position of an object on the transport assembly given a set of boundary points, is to choose the Least Squares Method when there are at least nine boundary points (i.e., $n \geq 9$) and the Pair Method otherwise.

Another way to combine the two methods involves using the Pair Method when there are less than seven boundary points (i.e., n<7) and using a combination of the two methods otherwise. It will be appreciated by those skilled in the art that when there are less than seven boundary points there exists at least two empty groups of points at step 510 in FIG. 5. Using this combination method, when there are seven or more boundary points, evaluation of the boundary points begins with the Least Squares Method. If there is no more than one empty group at step 510 in FIG. 5, then the Least Squares Method is used to determine the position of the object on the transport assembly; otherwise, a switch is made and the Pair method is used to make the determination.

An additional way to combine the two methods involves using the Least Squares Method when the number of boundary points is greater than or equal to ten (i.e., $n \geq 10$). When the number of boundary points is less than ten (i.e., n<10), the Pair Method is used to assign points to sides of possible rectangles and the Least Squares Method is used to compute the final rectangle. Even though these specific methods have been presented for combining the Least Squares Method and the Pair Method, it will be appreciated by those skilled in the art that many other variations for combining these methods are possible.

B.3 Knowing the Size of the Object in Advance

Until this point it is assumed that the size of the object on the transport assembly is unknown. However, in certain circumstances the size of the object may be known in advance. For example, in the event the transport assembly is part of a paper transport of a printer the size of the piece of paper on which an image is printed may be known in advance.

When the size of the object is known in advance in the case of the Pair Method, the size of the object is used to compute the score at step 1414 shown in FIG. 14 by adding the deviation of the computed rectangle bounding box and the desired rectangle size to the score at step 1414.

In contrast when the size of the object is known in advance in the case of the Least Squares Method, the size of the object is ignored in one embodiment because the method is adapted to compute the size of the object without any additional information. However, in an alternate embodiment if the object is known to have a width and a height (i.e., w×h) then the equations for the lines [A], [B], [C], and [D] become the following:

$$y = mx + b, \quad [E]$$

$$my = -x + d, \quad [F]$$

$$y = mx + b + h/\cos(\theta), \text{ and} \quad [G]$$

$$my = -x + d + w/\cos(\theta), \quad [H]$$

where:

$$\theta = \arctan(m) \text{ and so } 1/\cos(\theta) = \sqrt{m^2+1},$$

m is a slope, and b and d are y-intercepts.

While the equations for the lines [A], [B], [C], and [D] are linear in their unknowns b, c, d, e, and m, the equations for the lines [E], [F], [G], and [H] set forth above for this embodiment of the Least Squares Method are nonlinear because of the arctan(m) terms. Nonlinear terms preclude simple equations for the unknowns similar to the equations [4], [5], [6], and [7].

One possible variation of this embodiment is to use equations for the lines [A], [B], [C], and [D] as a starting point, and then use an iteration method on equations for the lines [E], [F], [G], and [H], as disclosed for example by Philip Gill et al., in "Practical Optimization," Academic Press, 1981, which is incorporated herein by reference.

Another preferred variation of this embodiment exists when an estimate of the slope m is known. This alternate method uses the estimate of the slope m to replace the nonlinear $1/\cos(\theta) = \sqrt{m^2+1}$ term in the equations [G] and [H] with the following linear approximation, which is a first order Taylor Series approximation, of the slope m:

$$\sqrt{m^2+1} = \frac{1}{\cos(\theta)} \approx k_e + k_e m_e m$$

where:

$\theta_e$ is an estimate of the orientation of the rectangular object relative to the transport assembly, $k_e = \cos(\theta_e)$, and $m = \tan(\theta)$.

The derivation that is produced using equations [4], [5], and [6] can be repeated using the equations [E], [F], [G], and [H] in place of the equations [A], [B], [C], [D] and substituting $k_e + k_e m_e m$ for $1/\cos(\theta)$. This substitution produces the following estimate of the slope m, and y-intercept values b and d for the equations [E], [F], [G], and [H], when the height h and width w of the rectangular object on the transport assembly are known:

$$m = \frac{D_3 - (D_1 + D_2)(n_B + n_D)}{D_4 + (D_5 + D_6)(n_B + n_D)}, \quad [8]$$

$$b = \frac{(hk_e n_C + hk_e m m_e n_C + m x_0 + m x_C - y_A - y_C)}{(n_A + n_D)}, \text{ and}$$

$$d = \frac{(k_e n_D w + k_e m m_e n_D w - x_B - x_D - m y_B - m y_C)}{(n_B + n_D)},$$

where:

$D_1 = (h^2 k_e^2 m_e n_A n_C + (x_A + x_C)(y_A + y_C) + hk_e(-n_C x_A + n_A x_C + m_e n_C y_A - m_e n_A y_C)$, $D_2 = (n_A + n_C)(-(xy)_A + (xy)_B - (xy)_C + (xy)_D + k_e w(k_e m_e n_D w - m_e x_D - y_D))$ $D_3 = (n_A + n_C)(k_e n_D w - x_B - x_D)(k_e m_e n_D w - y_B - y_D)$, $D_4 = -(n_A + n_C)(-k_e m_e n_D w + y_B + y_D)^2$, $D_5 = -(hk_e m_e n_C + x_A + x_C)^2$, $D_6 = (n_A + n_C)((xx)_A + (xx)_C + D_1) + (yy)_B + (yy)_D)$, $D_7 = k_e m_e (h^2 k_e m_e n_C + 2hx_C + w(k_e m_e n_D w - 2y_D))$, $\theta_e$ is an estimate of the orientation of the rectangular object relative to the transport assembly, $k_e = \cos(\theta_e)$, $m_e = \tan(\theta_e)$, $(x_i, y_i)$ is a boundary point of the rectangle, $S_A$, $S_B$, $S_C$, and $S_D$, are four groups of boundary points corresponding to each side of the rectangle, and $$n_A = \sum_{i \in S_A} 1, n_B = \sum_{i \in S_B} 1, n_c = \sum_{i \in S_C} 1, \text{ and } n_D = \sum_{i \in S_D} 1,$$

are the number of boundary points $(x_i, y_i)$ in each group of boundary points $S_A$, $S_B$, $S_C$, and $S_D$, of the rectangle, respectively.

h is a first dimension of the rectangle (e.g., height), w is a second dimension of the rectangle (e.g., width), $$x_A = \sum_{i \in S_A} x_i, x_B = \sum_{i \in S_B} x_i, x_C = \sum_{i \in S_C} x_i, x_D = \sum_{i \in S_D} x_i,$$

$$y_A = \sum_{i \in S_A} y_i, y_B = \sum_{i \in S_B} y_i, y_C = \sum_{i \in S_C} y_i, y_D = \sum_{i \in S_D} y_i,$$

$$(xy)_A = \sum_{i \in S_A} x_i y_i, (xy)_B = \sum_{i \in S_B} x_i y_i, (xy)_C = \sum_{i \in S_C} x_i y_i, (xy)_D = \sum_{i \in S_D} x_i y_i,$$

$$(xx)_A = \sum_{i \in S_A} x_i x_i, (yy)_B = \sum_{i \in S_B} y_i y_i, (xx)_C = \sum_{i \in S_C} x_i x_i, (yy)_D = \sum_{i \in S_D} y_i y_i.$$

B.4 Knowing the Size of the Object but Only Four Boundary Points

It will be appreciated by those skilled in the art that when there exists only four boundary points, an infinite family of rectangle pass through those points. It will be further appreciated by those skilled in the art that for a given set of four points there exists some configurations with no solution. For example, there exists no solution when three points are arranged as the vertices of an equilateral triangle, with a fourth point in the center. However, if the rectangle is constrained to have a fixed dimension (i.e., height and width), then there exists only a finite number of solutions for a given set of four points. FIG. 20 illustrates an example when there exists only four boundary points $p_0$, $p_1$, $p_2$, $p_3$, with at least one boundary point per side. Although there sometimes exists an infinite number of possible rectangles that could pass through the four points $p_0$, $p_1$, $p_2$, $p_3$ when the size of the object is not known in advance, there exists only a finite number of possible rectangles when the size is known in advance.

As shown in FIG. 20, when the size of the object is known in advance and four boundary points $p_0$, $p_1$, $p_2$, $p_3$, are known with at least one boundary point per side, the position of the object 2004 can be computed by first sorting the points about a computed centroid 2006. Using the sorted points, the expected height ("h") and width ("w") of the object 2004 shown in FIG. 20 are verified by computing the angle θ using the four points $p_0$, $p_1$, $p_2$, $p_3$. Assuming a line segment 2008 drawn from the points $p_0$ to $p_2$ has length "l", the rectangle defining the object is either defined by h=l cos(θ) or w=l cos(θ), where θ is the angle shown in FIG. 20. This computation yields at most two values of θ (i.e., two rectangles) that satisfy the expected height and width of the object (i.e., h=l cos(θ) or w=l cos(θ)). In addition, assuming that a line segment can be drawn from the points $p_1$ to $p_3$, then θ can be computed in a similar manner to produce two additional rectangles. The rectangle with the minimum deviation from the expected height ("h") and width ("w") is selected as the solution that identifies the position of the object on the transport assembly.

B.5 Knowing the Size of the Object but no Boundary Points on one Side

In the event there is a single side or two adjacent sides with no identified boundary points and the size of the object is known, then the position of the object on the transport assembly can be computed with either method. In the event the size of the object (i.e., height and width dimensions) is not known, then there exists an infinite number of possible rectangles that satisfy a given set of boundary points when there is less than one boundary point per side.

In an alternate embodiment, the Least Squares Method set forth above can be modified to identify the position of the object when the boundary points identify only three sides of the object and the height and width of the object are known. To modify the Least Squares Method to satisfy these conditions, one of the four equations [A], [B], [C], and [D] is dropped and three sides with the three remaining equations are computed. The fourth missing side is then computed using the known height and width and the three computed sides. In addition to knowing in advance the height and width of the rectangular object, if an estimate of the orientation (i.e., m) of the rectangular object relative to the transport assembly is known, then equation [8] can be used to compute an estimate of the slope m for the four equations [E], [F], [G], and [H].

Figure 21:
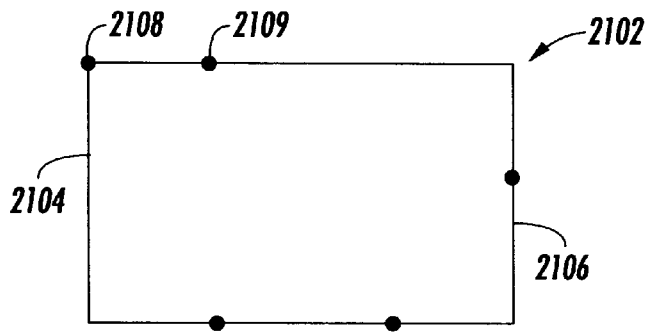
FIG. 21 illustrates a rectangular bounding box that is formed with a line defined by the points 2108 and 2109 and one side has no boundary points.
Figure 22:
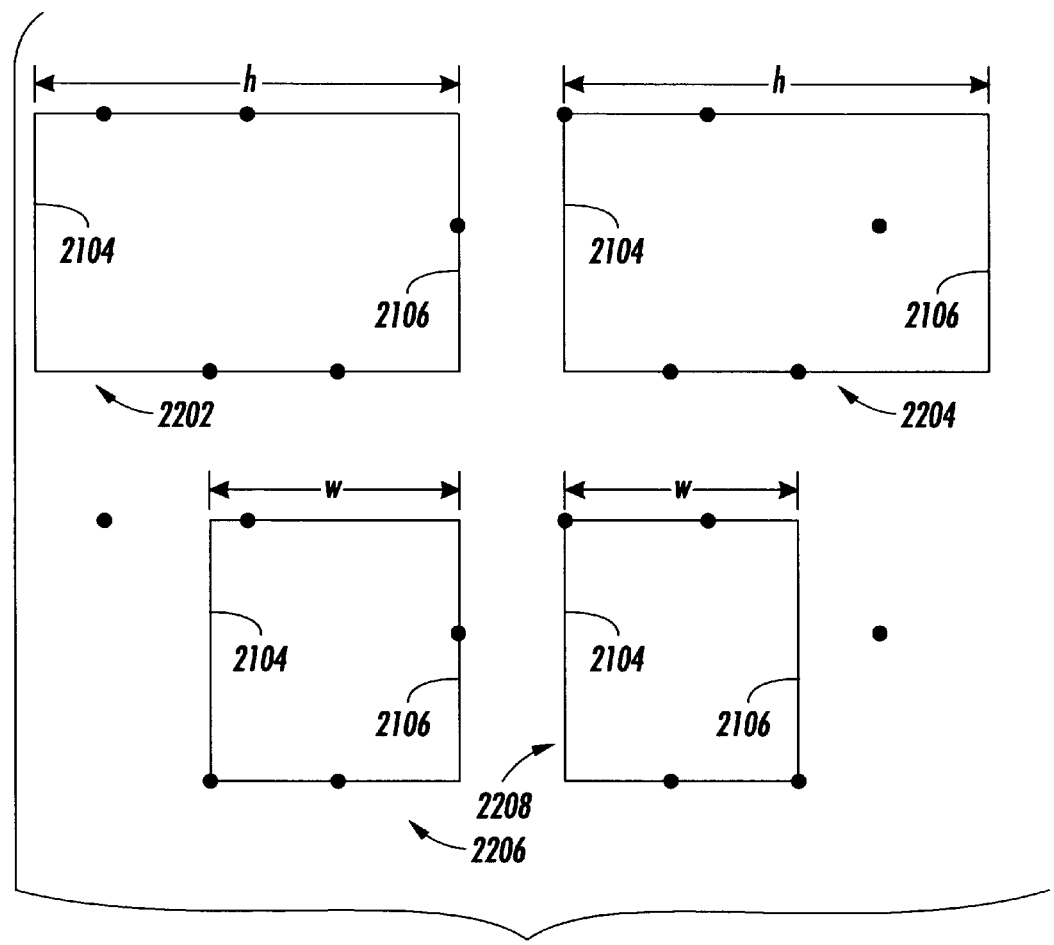
FIG. 22 illustrates four possible rectangles that are identified given the rectangular bounding box shown in FIG. 21.

There also exists a plurality of ways to modify the Pair Method to identify the position of the object when the boundary points identify only three sides of the object and the height and length of the object are known in advance. FIGS. 21–22 illustrate one example for modifying the Pair Method to satisfy these conditions. Initially as illustrated in FIG. 21, a rectangular bounding box 2102 is formed with a line defined by the points 2108 and 2109 at step 1412 in FIG. 14. Before performing step 1414 in FIG. 14, four possible rectangles 2202, 2204, 2206, and 2208 illustrated in FIG. 22 are determined using the known height ("h") and width ("w").

Rectangles 2202 and 2204 are determined by assuming the line through the selected pair of points 2108 and 2109 and the side parallel to it is of length "h". More specifically, the side 2104 is moved to the left from its position in FIG. 21 so that the sides 2104 and 2106 are a distance "h" apart. The rectangle 2204 is defined by moving the side 2106 to the right from its position in FIG. 21 so that the sides 2104 and 2106 are a distance "h" apart. Similarly, the rectangles 2206 and 2208 are determined by assuming the line through the same pair of points is of length "w" instead of "h", and the side 2104 is moved for the rectangle 2206 and the side 2106 is moved for the rectangle 2208 so that the sides 2104 and 2106 are a distance "w" apart. The rectangle with the minimum deviation from the five points is selected as the solution that identifies the position of the object on the transport assembly.

C. Miscellaneous

It will be appreciated that portions of the system embodying the present invention may be readily implemented in software using software development environments that provide source code that can be used on a variety of hardware platforms. Alternatively, portions of the system may be implemented partially or fully in hardware using standard logic circuits. Whether software or hardware is used to implement different portions of the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for locating a rectangular object on a surface of a transport assembly, comprising:

recording a set of boundary points that identify boundary locations of the rectangular object on the surface of the transport assembly; the set of boundary points including at least one boundary point that does not lie on the boundary of the rectangular object; and computing an equation of a rectangle that minimizes deviation of the boundary points in the set of boundary points from the boundary of the rectangular object; the equation of the rectangle defining a position of the rectangular object on the transport assembly.

2. The method according to claim 1, wherein the set of boundary points are recorded from a set of point sensors arranged in a pattern on the transport assembly that produces boundary information of the rectangular object.

3. The method according to claim 2, wherein the set of point sensors are arranged in arrays of point sensors on the transport assembly.

4. The method according to claim 3, wherein the arrays of point sensors are arranged perpendicular to each other on the transport assembly.

5. The method according to claim 3, wherein the arrays of point sensors are arranged in a herringbone pattern on the transport assembly.

6. The method according to claim 3, wherein the arrays of point sensors are rotated relative to adjacent arrays of point sensors on the transport assembly by a predefined angle.

7. The method according to claim 1, wherein said computing further comprises assigning each point in the set of boundary points to one of four groups of points with each group of points corresponding to one side of the rectangular object.

8. The method according to claim 7, wherein said computing further comprises computing a slope value m defining the equation of a rectangle without using dimensions of the rectangular object.

9. The method according to claim 8, wherein said computing further comprises defining the equation of the rectangle using equations of a line as follows:

$$y = mx + b,$$

$$y = \left(\frac{-1}{m}\right)x + \frac{d}{m},$$

$$y = mx + c, \text{ and}$$

$$y = \left(\frac{-1}{m}\right)x + \frac{e}{m},$$

where m is a slope; and b, c, d, and e are y-intercepts.

10. The method according to claim 9, wherein said computing further comprises computing a slope value m according to the following equation:

$$m = \frac{\left(C_2 - \frac{\sum_{i \in S_A} x_i \sum_{i \in S_A} y_i}{n_A} + \frac{\sum_{i \in S_B} x_i \sum_{i \in S_B} y_i}{n_B} - \frac{\sum_{i \in S_C} x_i \sum_{i \in S_C} y_i}{n_C} + \frac{\sum_{i \in S_D} x_i \sum_{i \in S_D} y_i}{n_D}\right)}{\left(C_1 - \frac{\left(\sum_{i \in S_A} x_i\right)^2}{n_A} - \frac{\left(\sum_{i \in S_B} y_i\right)^2}{n_B} - \frac{\left(\sum_{i \in S_C} x_i\right)^2}{n_C} - \frac{\left(\sum_{i \in S_D} y_i\right)^2}{n_D}\right)},$$

where:

($x_i$, $y_i$) is a boundary point of the rectangular object, $S_A$, $S_B$, $S_C$, and $S_D$, are four groups of boundary points corresponding to each side of the rectangular object, $$n_A = \sum_{i \in S_A} 1, n_B = \sum_{i \in S_B} 1, n_C = \sum_{i \in S_C} 1, \text{ and } n_D = \sum_{i \in S_C} 1,$$

are the number of boundary points ($x_i$, $y_i$) in each group of boundary points $S_A$, $S_B$, $S_C$, and $S_D$, of the rectangular object, respectively, $$C_1 = \sum_{i \in S_A} x_i^2 + \sum_{i \in S_B} y_i^2 + \sum_{i \in S_C} x_i^2 + \sum_{i \in S_D} y_i^2, \text{ and}$$

$$C_2 = \sum_{i \in S_A} y_i x_i - \sum_{i \in S_B} x_i y_i + \sum_{i \in S_C} x_i y_i - \sum_{i \in S_D} x_i y_i.$$

11. The method according to claim 10, wherein said computing further comprises computing y-intercept values b, c, d, and e with the slope value m according to the following equations:

$$b = \frac{\sum_{i \in S_A} y_i - m \sum_{i \in S_A} x_i}{n_A},$$

$$c = \frac{\sum_{i \in S_C} y_i - m \sum_{i \in S_C} x_i}{n_C},$$

$$d = \frac{m \sum_{i \in S_B} y_i + \sum_{i \in S_B} x_i}{n_B}, \text{ and}$$

$$e = \frac{m \sum_{i \in S_D} y_i + \sum_{i \in S_D} x_i}{n_D}.$$

12. The method according to claim 7, wherein said computing further comprises computing a slope value m defining the equation of a rectangle using dimensions of the rectangular object.

13. The method according to claim 12, wherein said computing further comprises computing a slope value m defining the equation of a rectangle using an estimate of the orientation θ of the rectangular object on the transport assembly.

14. The method according to claim 13, wherein said computing further comprises defining the equation of the rectangle using equations of a line as follows:

$$y = mx + b,$$

$$my = -x + d,$$

$$y = mx + b + h/\cos(\theta), \text{ and}$$

$$my = -x + d + w/\cos(\theta),$$

where:

θ = arctan(m), m is a slope; and b and d are y-intercepts.

15. The method according to claim 14, wherein said computing further comprises approximating 1/cos(O) with a linear approximation as follows:

$$\sqrt{m^2 + 1} = \frac{1}{\cos(\theta)} \approx k_e + k_e m_e m,$$

where:

$\theta_e$ is an estimate of the orientation of the rectangular object relative to the transport assembly, $k_e = \cos(\theta_e)$, and $m = \tan(\theta)$.

16. The method according to claim 15, wherein said computing further comprises computing a slope value m according to the following equation:

$$m = \frac{D_3 - (D_1 + D_2)(n_B + n_D)}{D_4 + (D_5 + D_6)(n_B + n_D)},$$

where:

$D_1 = (h^2 k_e^2 m_e n_A n_C + (x_A + x_C)(y_A + y_C) + h k_e(-n_C x_A + n_A x_C + m_e n_C y_A - m_e n_A y_C),$ $D_2 = (n_A + n_C)(-(xy)_A + (xy)_B - (xy)_C + (xy)_D + k_e w(k_e m_e n_D w - m_e x_D - y_D))$ $D_3=(n_A+n_C)(k_e n_D w-x_B-x_D)(k_e m_e n_D w-y_B-y_D)$, $D_4=-(n_A+n_C)(-k_e m_e n_D w+y_B+y_D)^2$, $D_5=-(hk_e m_e n_C+x_A+x_C)^2$, $D_6=(n_A+n_C)((xx)_A+(xx)_C+D_7)+(yy)_B+(yy)_D)$, $D_7=k_e m_e(h^2 k_e m_e n_C+2hx_C+w(k_e m_e n_D w-2y_D))$, $m_e=\tan(\theta_e)$, $(x_i, y_i)$ is a boundary point of the rectangular object, $S_A$, $S_B$, $S_C$ and $S_D$, are four groups of boundary points corresponding to each side of the rectangular object, $$n_A = \sum_{i \in S_A} 1, n_B = \sum_{i \in S_B} 1, n_C = \sum_{i \in S_C} 1, \text{ and } n_D = \sum_{i \in S_C} 1,$$

are the number of boundary points $(x_i, y_i)$ in each group of boundary points $S_A$, $S_B$, $S_C$, and $S_D$, of the rectangular object, respectively, h is a first dimension of the rectangular object, w is a second dimension of the rectangular object, $$x_A = \sum_{i \in S_A} x_i, x_B = \sum_{i \in S_B} x_i, x_C = \sum_{i \in S_C} x_i, x_D = \sum_{i \in S_D} x_i,$$

$$y_A = \sum_{i \in S_A} y_i, y_B = \sum_{i \in S_B} y_i, y_C = \sum_{i \in S_C} y_i, y_D = \sum_{i \in S_D} y_i,$$

$$(xy)_A = \sum_{i \in S_A} x_i y_i, (xy)_B = \sum_{i \in S_B} x_i y_i (xy)_C = \sum_{i \in S_C} x_i y_i, (xy)_D = \sum_{i \in S_D} x_i y_i,$$

$$(xx)_A = \sum_{i \in S_A} x_i x_i, (yy)_B = \sum_{i \in S_B} y_i y_i (xx)_C = \sum_{i \in S_C} x_i x_i, (yy)_D = \sum_{i \in S_D} y_i y_i.$$

17. The method according to claim 16, wherein said computing further comprises computing y-intercept values b and d with the slope value m according to the following equations:

$$b = \frac{(hk_e n_C + hk_e mm_e n_C + mx_0 + mx_C - y_A - y_C)}{(n_A + n_D)}, \text{ and}$$

$$d = \frac{(k_e n_D w + h_e mm_e n_D w - x_B + x_D - my_B - my_C)}{(n_B + n_D)}.$$

18. The method according to claim 1, wherein said computing assigns each point in the set of boundary points to one of four groups of points by:

locating a bounding rectangle that bounds all the points in the set of boundary points; and forming a line through opposing pairs of corners of the bounding rectangle.

19. The method according to claim 1, wherein said computing further comprises:

computing a centroid using the set of boundary points;

sorting points in the set of boundary points by angle about the computed centroid;

selecting a pair of adjacent points from the sorted set of boundary points;

computing a line through the selected pair of adjacent points; and computing a rectangle bounding box with the computed line that includes all of the points in the set of boundary points.

20. An apparatus for locating a rectangular object on a transport assembly, comprising:

sensors for recording a set of boundary points that identify boundary locations of the rectangular object on the surface of the transport assembly; the set of boundary points including at least one boundary point that does not lie on the boundary of the rectangular object; and a transport controller coupled to the sensors for computing an equation of a rectangle that minimizes deviation of the boundary points in the set of boundary points from the boundary of the rectangular object; the equation of the rectangle defining a position of the rectangular object on the transport assembly.

21. The apparatus according to claim 20, wherein the sensors further comprises point sensors arranged in arrays of point sensors on the transport assembly.

22. The apparatus according to claim 21, wherein the arrays of point sensors are arranged perpendicular to each other on the transport assembly.

23. The apparatus according to claim 21, wherein the arrays of point sensors are arranged in a herringbone pattern on the transport assembly.

24. The apparatus according to claim 21, wherein the arrays of point sensors are rotated relative to adjacent arrays of point sensors on the transport assembly.

25. The apparatus according to claim 20, wherein said transport controller assigns each point in the set of boundary points to one of four groups of points, with each group of points corresponding to one side of the rectangular object.

26. The apparatus according to claim 20, wherein said transport controller further comprises:

means for locating a bounding rectangle that bounds all the points in the set of boundary points; and means for forming a line through opposing pairs of corners of the bounding box.

27. The apparatus according to claim 20, wherein said transport controller performs the operations of:

means for computing a centroid using the set of boundary points;

means for sorting points in the set of boundary points by angle about the computed centroid;

means for selecting a pair of adjacent points from the sorted set of boundary points;

means for computing a line through the selected pair of adjacent points; and means for computing a rectangle bounding box with the computed line that includes all of the points in the set of boundary points.

28. The apparatus according to claim 20, further comprising actuators coupled to the transport controller for moving the rectangular object on the transport assembly.

* * * * *